Dec. 15, 1925.

J. C. HENDERSON 1,565,364

DRAWING SHEET GLASS

Filed Nov. 12, 1923    6 Sheets-Sheet 1

Inventor
JOHN C. HENDERSON.
By Attorney
C. A. Rowley

Dec. 15, 1925.

J. C. HENDERSON

DRAWING SHEET GLASS

Filed Nov. 12, 1923

Inventor
JOHN C. HENDERSON.
By Attorney

Dec. 15, 1925.  1,565,364
J. C. HENDERSON
DRAWING SHEET GLASS
Filed Nov. 12, 1923  6 Sheets-Sheet 3
Fig.4.
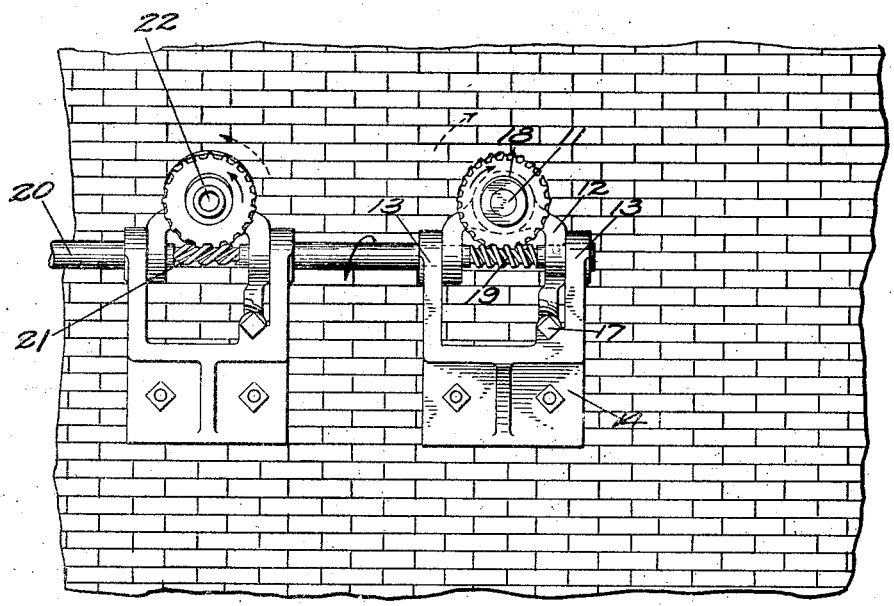
Fig.5.
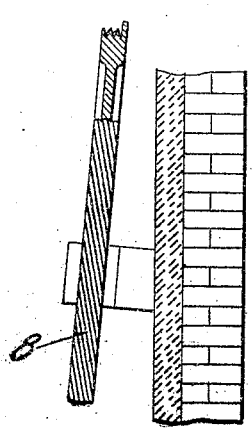
Fig.6.
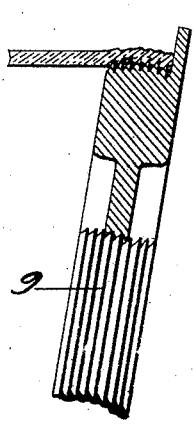
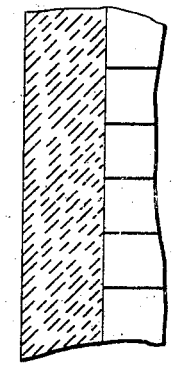
Inventor
JOHN C. HENDERSON
By Attorney C. A. Rowley

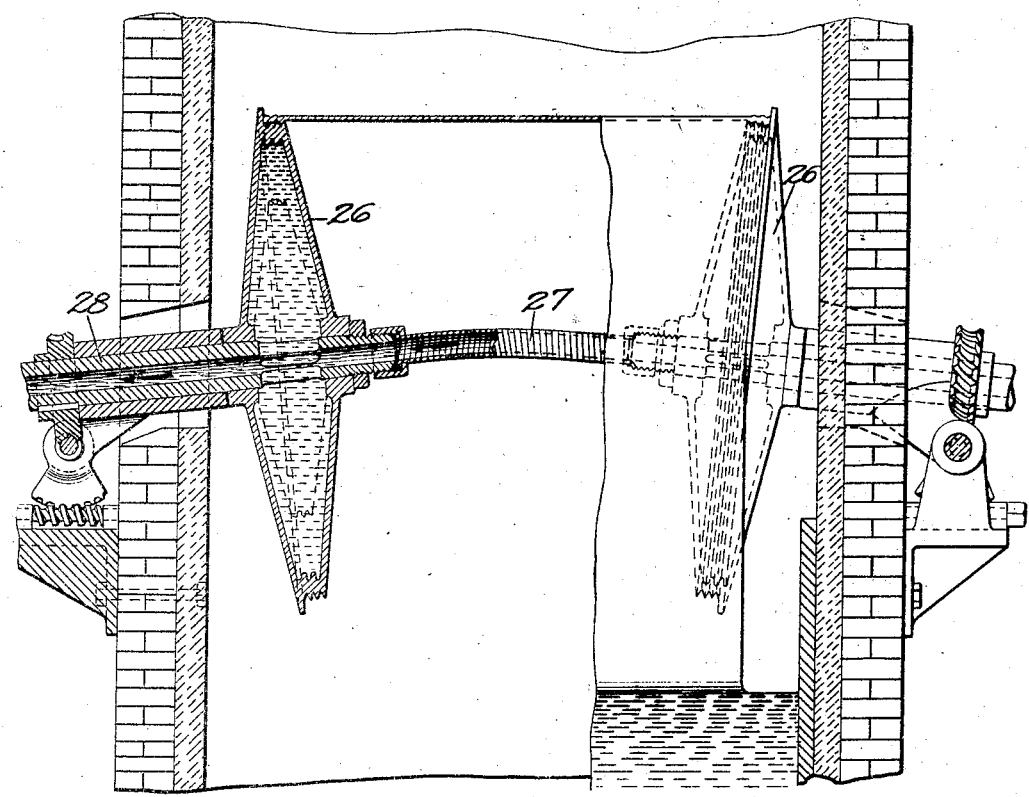

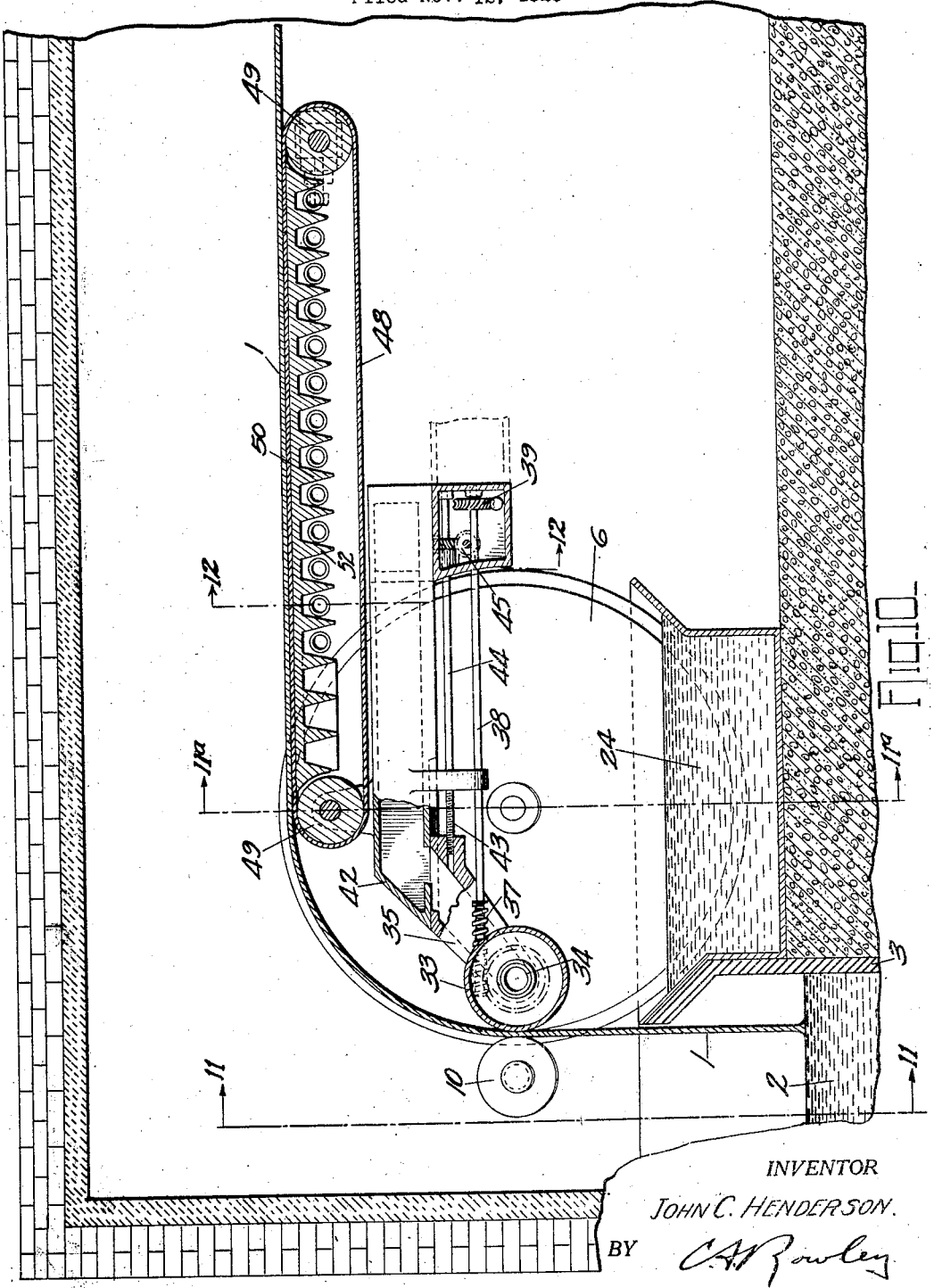

INVENTOR
JOHN C. HENDERSON.
BY C. A. Rowley
ATTORNEY

Patented Dec. 15, 1925.

1,565,364

UNITED STATES PATENT OFFICE.

JOHN C. HENDERSON, OF NEW YORK, N. Y., ASSIGNOR TO THE LIBBEY-OWENS SHEET GLASS COMPANY, OF TOLEDO, OHIO, A CORPORATION OF OHIO.

DRAWING SHEET GLASS.

Application filed November 12, 1923. Serial No. 674,168.

*To all whom it may concern:*

Be it known that I, JOHN C. HENDERSON, a citizen of the United States, residing at New York, in the county of New York and State of New York, have invented new and useful Improvements in Drawing Sheet Glass, of which the following is a specification.

This invention relates to the art of drawing a continuous sheet of glass, and more particularly to an improved method and apparatus for bending the plastic glass sheet from one plane to another without injuring the surfaces thereof.

In certain well-known systems for producing sheet glass, for example the Colburn process as set forth in the Colburn Patent 1,248,809, granted December 4, 1917, the glass sheet is drawn upwardly from a pool of molten glass and then, while partially set but still somewhat plastic, is bent through approximately 90° into the horizontal plane where it is carried away through suitable drawing and flattening mechanism into a leer. While being bent from the vertical to the horizontal plane, the sheet is supported upon some form of bending member, usually a highly polished metal roller. It is essential that the cylindrical sheet-supporting surface of this roller be absolutely smooth, clean, and maintained at just the proper temperature, else the delicate fire-polished surface of the plastic sheet will be injured while passing over the roller.

In order to avoid the difficulties incident to the use of such a bending member, the present system has been devised. According to the present invention, the plastic sheet, after becoming partially set, is gripped adjacent its edges, and supported upon, suitable members which move with the sheet during its bending period, preferably a pair of rather large metal discs or wheels. These edge-supporting members are so mounted that the sheet-supporting surfaces of the two opposite members diverge from one another as they move with the sheet so that a constantly increasing lateral tension is applied to the glass sheet throughout the bending operation. This lateral tension will prevent sagging of the unsupported main central portion of the sheet, which is carried from the vertical into the horizontal plane without contacting with any solid bodies which might otherwise injure the delicate fire-polished surface of the sheet.

The objects and advantages of this invention will be more clearly understood from the following detailed description of certain approved forms of apparatus embodying the principles of this invention.

In the accompanying drawings:

Fig. 4 is a partial side elevation indicating a portion of the operating means for the edge-supporting members.

Fig. 5 is a detail view indicating the formation of the sheet-supporting surface of one form of the edge-supporting discs.

Fig. 6 is a similar view of a different configuration given to the sheet-supporting surface of the discs.

Fig. 7 is a vertical transverse section, similar to Figs. 2 and 3, of a slightly modified form of the apparatus.

Fig. 8 is a vertical central section through one of the supporting wheels shown in Fig. 7.

Fig. 9 is a central section through this wheel, taken substantially on the line 9—9 of Fig. 8.

Fig. 10 is a vertical longitudinal section, similar to Fig. 1, through another form of the apparatus.

Figure 1:
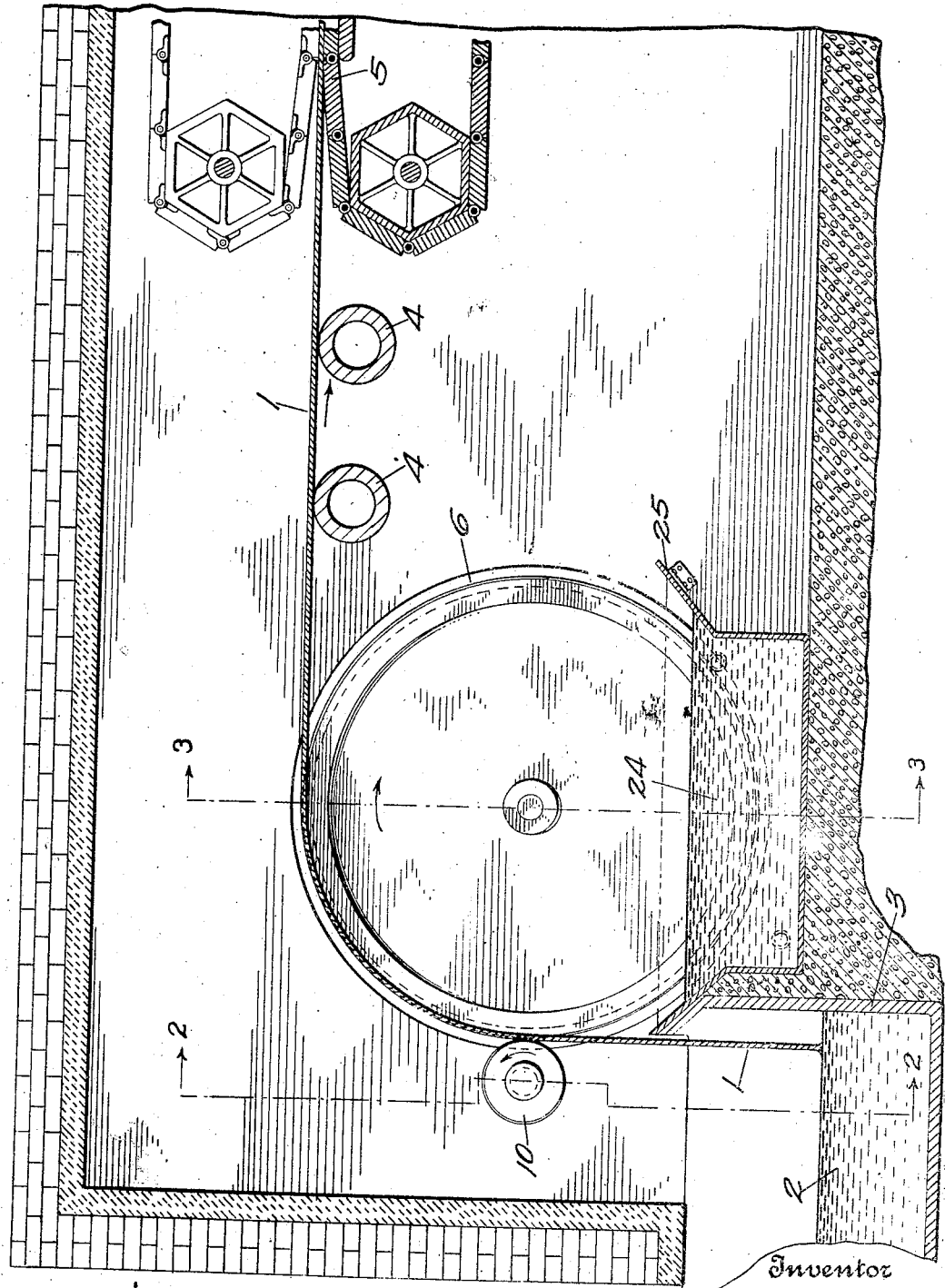
Fig. 1 is a longitudinal vertical section of one form of the apparatus.

Referring first to the form of apparatus shown in Figs. 1 to 6, inclusive, the glass sheet 1 is drawn upwardly from the pool of molten glass 2 in receptacle 3. It is to be understood that the form of receptacle 3 here shown is merely illustrative, and that any other approved configuration or proportions could be given to this receptacle, and that usually means for heating the same will be provided to maintain the molten glass 2 at the proper working temperature. Also any approved means, either within the molten glass or above the same, may be used to maintain the sheet 1 to a fixed width at its source.

After sheet 1 has been deflected from the vertical to the horizontal plane, as hereinafter described, the sheet is carried away over suitable supporting mechanism, such as rollers 4, into the drawing and flattening mechanism indicated generally at 5, and thence into the annealing leer. All of this may be as shown in the systems now in use and need not be further described here.

Suitably supported adjacent the side walls of the machine are a pair of rather large discs or wheels 6 having a comparatively narrow peripheral surface 7 adapted to grip and support the edge portions of the glass sheet 1. Discs 6 are so mounted that the vertical run of glass sheet 1 will be substantially tangent to the peripheral supporting surfaces 7. These surfaces 7 are suitably grooved or fluted to assist in gripping and holding the plastic edge portions of the glass sheet. As shown in Fig. 5, this fluted surface 8 consists of a series of teeth and grooves running diagonally of the supporting surface. In Fig. 6, the surface consists of a series of circular ribs 9 with sharp glass engaging edges. A pair of smaller rollers 10, mounted on axes substantially parallel to the axes of discs 6, engage the opposite faces of the edge portions of sheet 1 opposite their first point of contact with the discs 6 to assist in holding the glass sheet against the supporting discs and to enforce a more positive engagement of the sheet with the roughened peripheral supporting surface of the discs. The wheels or discs 6 are not so mounted that their sheet-carrying surfaces will travel in parallel planes, but are mounted at slight angles to one another so that the sheet-carrying portions of their peripheries travel along diverging paths from the points where the sheet 1 is first engaged to the points where the sheet is released in the horizontal plane. This is shown more clearly in Fig. 2 of the drawings. The result is that the somewhat plastic glass sheet 1 is subjected to a constant lateral stress or tension during the entire 90° of travel of the sheet during the bending operation. As shown in Figs. 3 and 4, the supporting and driving shafts 11 for discs 6, are carried in bearings 12, which bearings are transversely pivoted in the spaced arms 13 of brackets 14 at the sides of the machine. A sector 15 at one lower side of bearing 12 is engaged by an adjusting screw-bolt 16, having a head 17, readily accessible at the side of the machine. By suitably manipulating screw 16, the inclination of supporting bearing 12 and hence of disc 6 may be varied as desired. A worm wheel 18 keyed to the outer side of driving and supporting shaft 11, engages a worm 19 on a transversely arranged driving shaft 20, which is connected with any suitable source of power.

The auxiliary rollers 10 previously described, are adjustably supported and driven from shaft 20 by mechanism exactly similar to that just described for supporting discs 6. Of course, the pitch and proportions of worm-gearing 21 for the small rollers 10 will be so designed that the peripheral speed of these rollers 10 will conform to the adjacent peripheral speed of the larger supporting discs 6.

Figure 2:
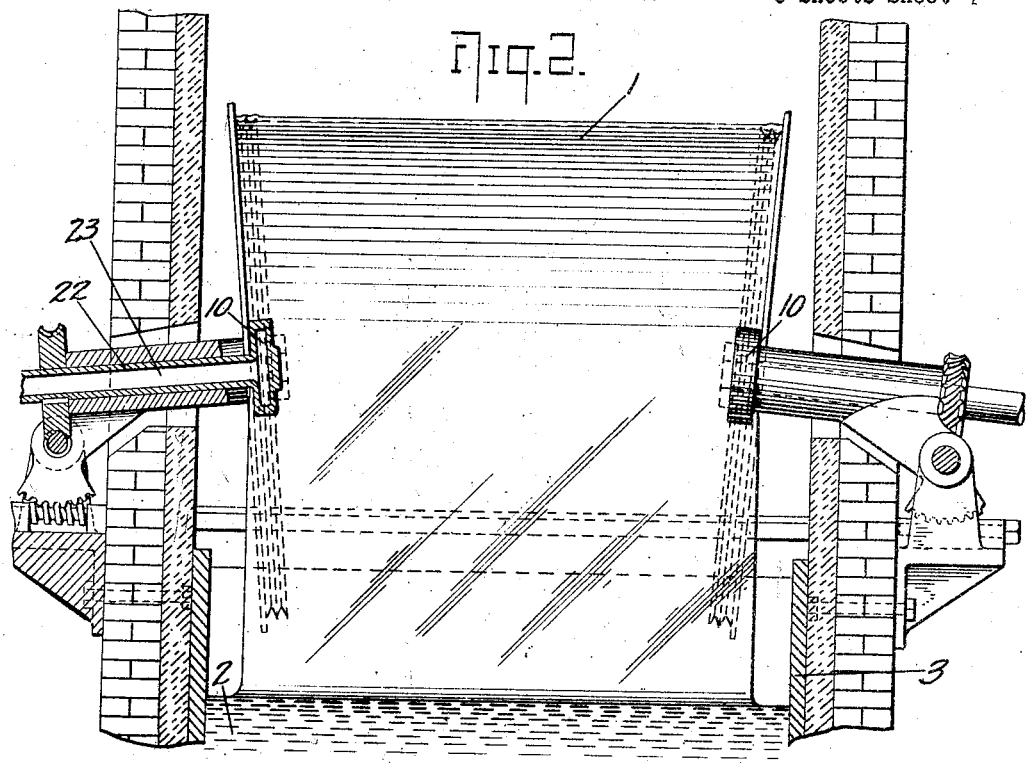
Fig. 2 is a transverse vertical section taken substantially on the line 2—2 of Fig. 1.
Figure 3:
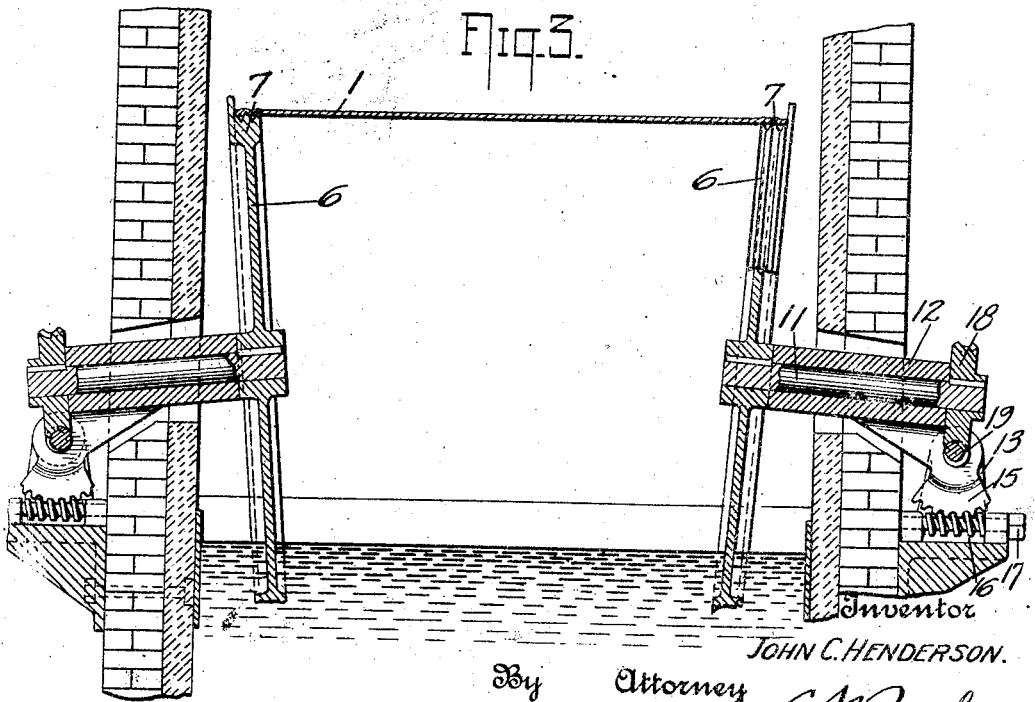
Fig. 3 is a similar section taken substantially on the line 3—3 of Fig. 1.

As indicated in Fig. 2, the driving discs 10 and their supporting shafts 22 are hollow as at 23, and are adapted to be internally cooled by flowing a suitable cooling fluid therethrough in any approved manner. The lower portions of driving discs 6 run in a bath of cooling fluid 24, usually water, carried in a suitable receptacle 25 beneath the driving discs.

In the modified form of the apparatus shown in Figs. 7, 8 and 9, the supporting discs 26 are hollow, and a cooling fluid such as water is adapted to be passed continually therethrough. As shown the cooling fluid passes in from the right, Fig. 7, through the first disc 26, thence through a flexible connection 27 to the opposite disc, and flows out through the hollow supporting and driving shaft 28. As shown in Figs. 8 and 9, the supporting wheel 26 is divided by a plurality of internal radial partitions 29 into a series of separate compartments 30, each communicating with the central fluid passage 31 through a slot 32 in the supporting shaft. Since the wheels 26 are constantly rotating, these interior chambers 30 will be carried around first above and then below the feed pipe 31 so that a circulation of fluid through each of the chambers 30 will be enforced.

Figure 11:
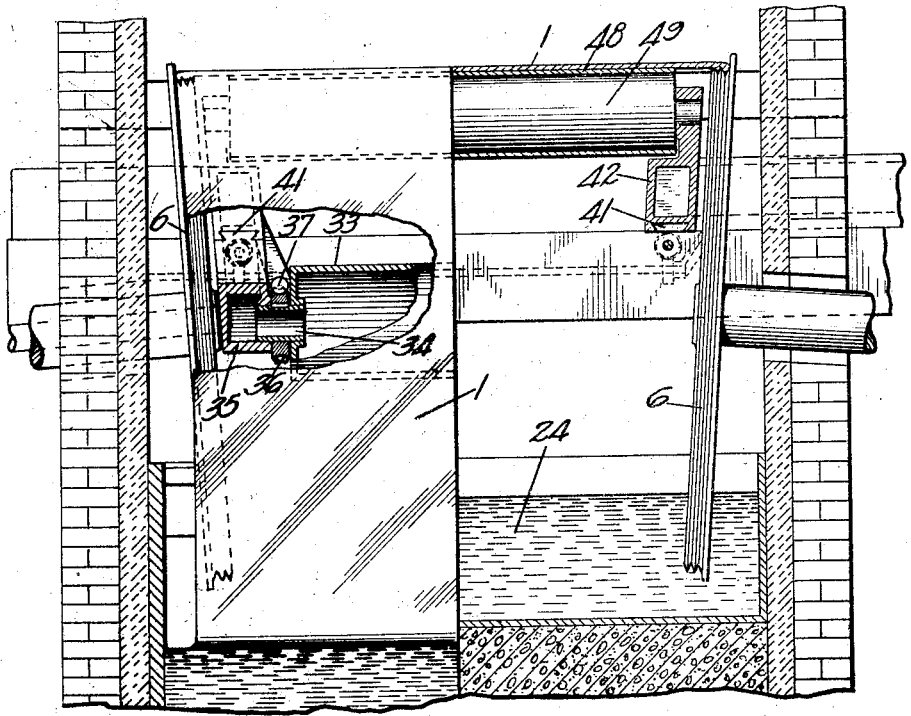
Fig. 11 is a transverse vertical section through the form of apparatus shown in Fig. 10, the left hand of this view being taken substantially on the line 11—11 of Fig. 10, while the right hand half is taken substantially on the line 11ª—11ª of Fig. 10.
Figure 12:
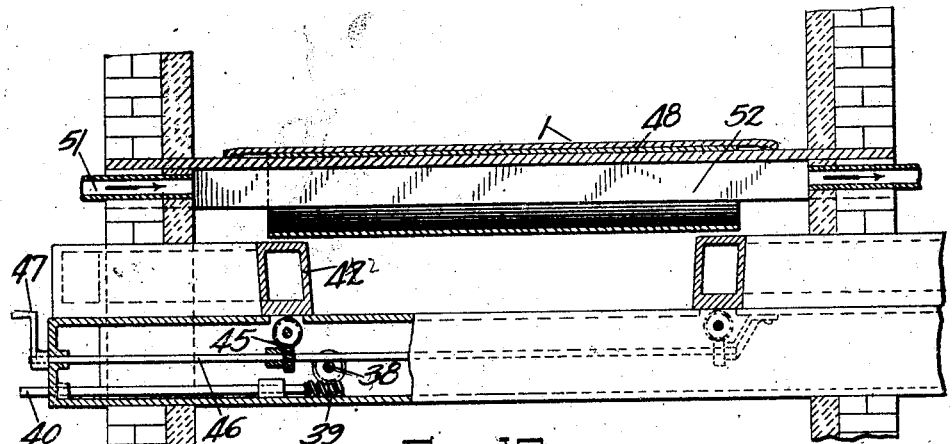
Fig. 12 is a transverse vertical section taken substantially on the line 12—12 of Fig. 10.

In the modified form shown in Figs. 10, 11 and 12, a cylindrical guide roller 33 is mounted between the supporting discs 6 and adjacent the upper end of the vertical run of sheet 1 to support the sheet at this point when found necessary or desirable. Roller 33 is hollow and at its ends has short shafts or gudgeons 34 which are rotatably mounted in the adjacent bearings 35. A worm wheel 36 keyed to one of the gudgeons 34 is driven by a worm 37 on a horizontal shaft 38, this shaft being driven through worm gearing 39 from a drive shaft 40 extending in through the side of the machine. Each of the supporting bearings 35 is slidably keyed as at 41 into the lower face of supporting beams 42 at the sides of the machine. The screwed ends 43 of adjusting shafts 44 engage internally threaded portions of the bearings 35, and these shafts 44 are adapted to be rotated from outside the machine through gearing 45 and the horizontal crossshaft 46. Any suitable means such as crank 47 at one side of the machine may be used to turn the two shafts 44 and simultaneously adjust the bearings 35 toward or from the inner surface of glass sheet 1. Supporting beams 42, bearings 35, gudgeons 34 and roller 33 are all hollow and in communication with one another as shown in the drawings, so that a cooling fluid such as air may be passed continuously through all of these members to prevent overheating. When the drawing of the sheet is first started, it is usually desirable to have a support for the central portions of the sheet between the side supporting discs 6, and at such times roller 33 will be moved out to the position shown in Fig. 10. However, when the machine is in normal operation and temperature conditions have been suitably regulated, the roller 33 may be withdrawn from contact with the sheet, after which the operation will be substantially the same as with the form of apparatus shown in Fig. 1, already described.

In the form of apparatus shown in Figs. 10 to 12, a suitable supporting and flattening belt 48, preferably of polished metal, is mounted on supporting rollers 49 so that the glass sheet 1 will be delivered onto the upper flat surface of this belt loop as the sheet emerges into the horizontal plane. The upper run of the supporting and flattening belt 48 is supported by a flat stationary table 50 positioned within the belt loop. This table 50 may be cooled by flowing a cooling liquid therethrough, or by blowing air as at 51 between radiating baffles 52 on the lower face of table 50.

With any of the forms of the invention as above described, it will be noted that the main central portion of the glass sheet remains entirely untouched throughout its vertical run and until after the bending operation has been completed. Before the sheet comes into contact with any solid supporting members in the horizontal plane, it has sufficiently set so that it is less liable to injury on its lower fire-polished surface.

Claims:

1. That improvement in the art of drawing sheet glass, which consists in bending the sheet from one plane to another while unsupported except at its edges, by applying lateral tension to the sheet during the bending operation.

2. That improvement in the art of drawing sheet glass, which consists in bending the sheet from one plane to another while unsupported except at its edges, by engaging the sheet edges and drawing the same forwardly and outwardly during the bending operation.

3. That improvement in the art of drawing a continuous sheet of glass from a molten source, consisting in first drawing the sheet upwardly and then bending the sheet into a substantially horizontal plane, the main central portion of the sheet being unsupported during the bending operation, while the sheet is subjected to lateral tension applied to the edge portions of the sheet.

4. That improvement in the art of drawing a continuous sheet of glass from a molten source, consisting in first drawing the sheet upwardly and then bending the sheet into a substantially horizontal plane, the main central portion of the sheet being unsupported during the bending operation, and the opposite edge portions of the sheet being drawn forwardly with the sheet and also outwardly, away from the center-line of the sheet during the bending operation.

5. In a sheet glass drawing apparatus, means for bending the sheet from one plane to another, comprising means for engaging the sheet edges and drawing them forwardly and outwardly during the bending operation.

6. In a sheet glass drawing apparatus, means for conveying the sheet from the vertical to the horizontal plane, comprising a spaced pair of discs for supporting the edges of the sheet on their peripheries, and means for supporting the discs so that the sheet carrying portions of their peripheries diverge from one another as they move with the sheet.

7. In a sheet glass drawing apparatus, means for conveying the sheet from the vertical to the horizontal plane, comprising a spaced pair of discs for supporting the edges of the sheet on their peripheries, means for supporting the discs so that the sheet carrying portions of their peripheries diverge from one another as they move with the sheet, and means for adjusting the supports to vary the angle of divergence as desired.

8. In a sheet glass drawing apparatus, means for supporting the edges of the sheet while it is being bent from the vertical to the horizontal plane, the central portion of the sheet being unsupported during the bending operation, and a cylindrical roller for engaging the inner side of the sheet at the top of its vertical run, and means for adjusting this roller into or out of contact with the sheet.

9. In a sheet glass drawing apparatus, means for supporting the edges of the sheet while it is being bent from the vertical to the horizontal plane, the central portion of the sheet being unsupported during the bending operation, a cylindrical roller for engaging the inner side of the sheet at the top of its vertical run, means for adjusting this roller into or out of contact with the sheet, and means for internally cooling this roller.

Signed at Harrison, in the county of Hudson, and State of New Jersey, this 5th day of November, 1923.

JOHN C. HENDERSON.